(12) United States Patent
Diehl

(10) Patent No.: US 9,707,723 B2
(45) Date of Patent: Jul. 18, 2017

(54) EMBOSSING TOOL

(71) Applicant: Patrick Allen Diehl, Miami, FL (US)

(72) Inventor: Patrick Allen Diehl, Miami, FL (US)

(73) Assignee: Patrick Allen Diehl, Miami, FL (US)

( * ) Notice: Subject to any disclaimer, the term of this patent is extended or adjusted under 35 U.S.C. 154(b) by 0 days.

(21) Appl. No.: 14/800,567

(22) Filed: Jul. 15, 2015

(65) Prior Publication Data

US 2017/0015069 A1   Jan. 19, 2017

(51) Int. Cl.
| | |
|---|---|
| *B29C 69/00* | (2006.01) |
| *B29C 67/00* | (2017.01) |
| *B29K 105/00* | (2006.01) |
| *B29L 23/00* | (2006.01) |
| *B29L 31/00* | (2006.01) |

(52) U.S. Cl.
CPC ........ *B29C 69/001* (2013.01); *B29C 67/0022* (2013.01); *B29C 2793/0018* (2013.01); *B29K 2105/258* (2013.01); *B29L 2023/22* (2013.01); *B29L 2031/7004* (2013.01)

(58) Field of Classification Search
CPC ............. B29C 69/001; B29C 67/0022; B29C 2793/0018; B29K 2105/258; B29L 2023/22; B29L 2031/7004

USPC .................................................. 425/385, 363
See application file for complete search history.

(56) References Cited

U.S. PATENT DOCUMENTS

| | | | | |
|---|---|---|---|---|
| 2,514,213 A | * | 7/1950 | Mason .................... | B29C 59/04 156/242 |
| 2,562,078 A | * | 7/1951 | Winnek .................... | B44B 3/04 264/134 |
| 3,471,879 A | * | 10/1969 | Kolec ........................ | B21J 9/18 470/141 |
| 4,264,390 A | * | 4/1981 | Armstrong .......... | B29C 44/5636 156/205 |
| 4,398,879 A | * | 8/1983 | DuPont ................. | B29B 13/025 425/392 |
| 4,781,569 A | * | 11/1988 | Kinugasa ............ | B29C 33/3814 156/245 |
| 2007/0126148 A1 | * | 6/2007 | Coyle ................... | B29C 33/305 264/299 |
| 2015/0008612 A1 | * | 1/2015 | Ishigaki .................. | B32B 25/10 264/171.12 |
| 2016/0121383 A1 | * | 5/2016 | Gro eruschkamp ... | B21D 5/015 72/385 |
| 2016/0235590 A1 | * | 8/2016 | Coe ................... | A61F 13/15585 |

* cited by examiner

*Primary Examiner* — Nahida Sultana
(74) *Attorney, Agent, or Firm* — Christian Sanchelima; Jesus Sanchelima

(57) ABSTRACT

A embossing tool consisting of a mandrel and embossing assembly.

2 Claims, 5 Drawing Sheets

EMBOSSING TOOL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is in the technical field of tool making. More particularly, the present invention is in the technical field of an embossing process for plastic pipe and tubing. Conventional plastic pipe and tube forming is done in the extrusion process or shortly thereafter. Custom applications are extremely expensive and require productions runs of 1000's of feet to be cost effective. This embossing tool is specific to functioning inside existing standard plastic pipe and tubing to form pockets protruding from the inside to the outside to accept agricultural grow baskets. Furthermore this process offers flexibility to alter center to center locations of pockets as well as axial variations as per customer design specification.

SUMMARY OF THE INVENTION

The present invention is an embossing tool that functions inside standard plastic pipe and tubing to from shapes from the inside to the outside to create a pocket for an agricultural grow basket to be inserted into.

DETAILED DESCRIPTION OF THE INVENTION

Figure 1:
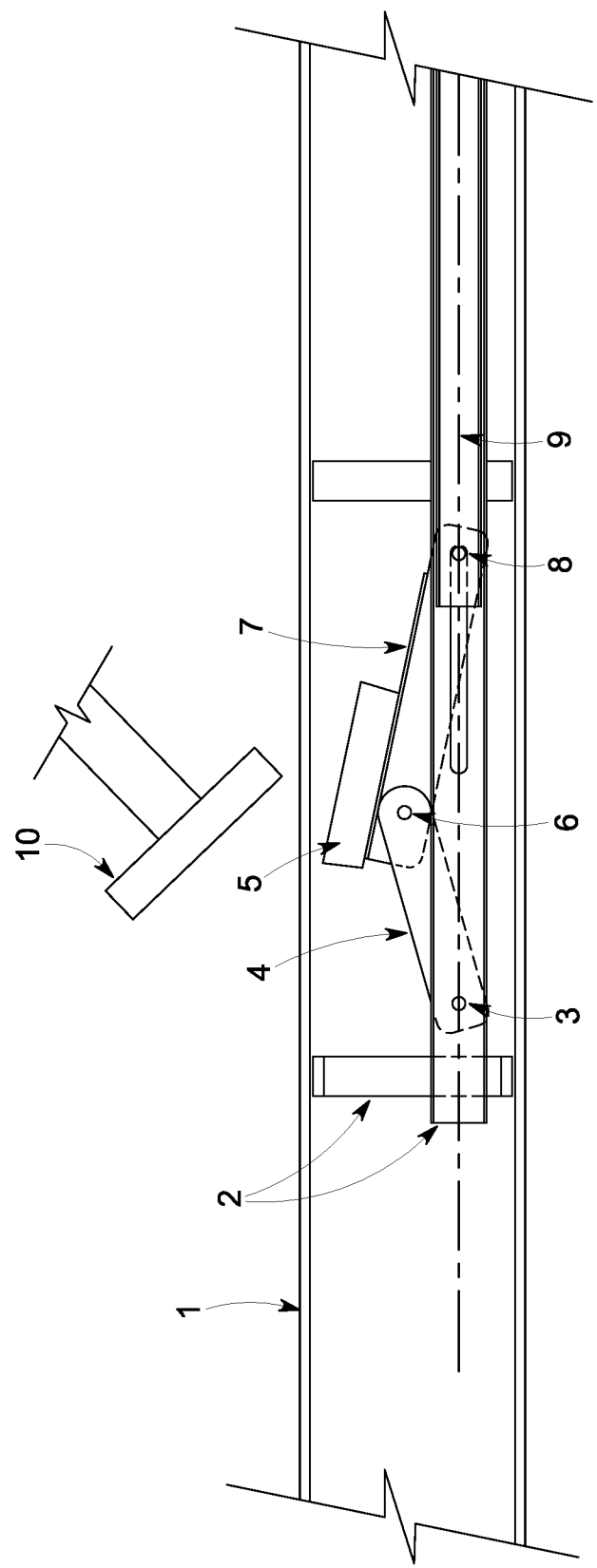
FIG. 1 is a section view of the embossing tool at the insertion stage of the present invention.
Figure 2:
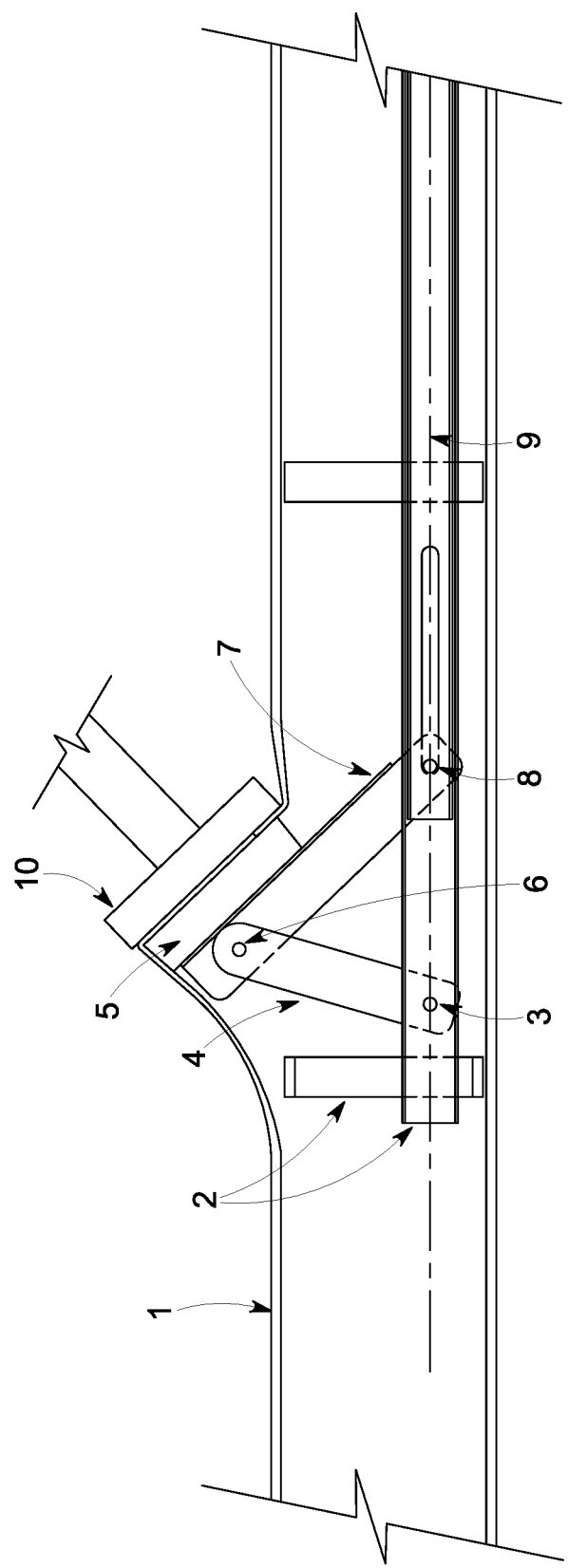
FIG. 2 is a section view of the embossing tool at the extrusion stage of the present invention.
Figure 3:
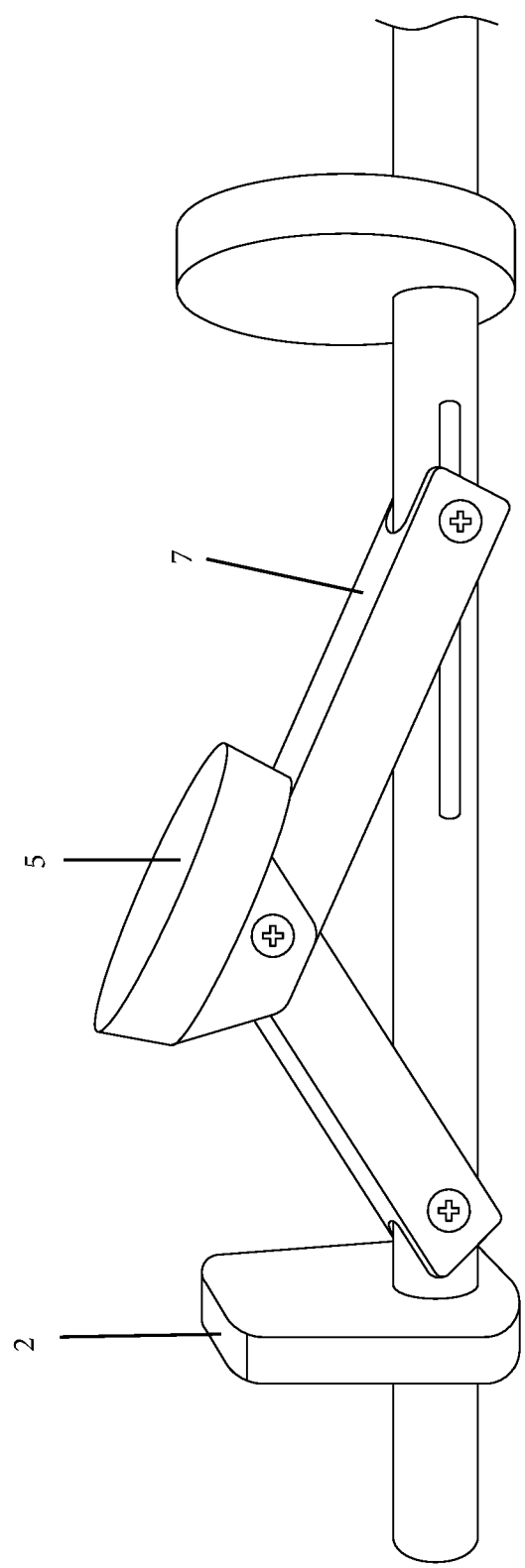
FIG. 3 is a photograph of a prototype of the present invention.
Figure 4:
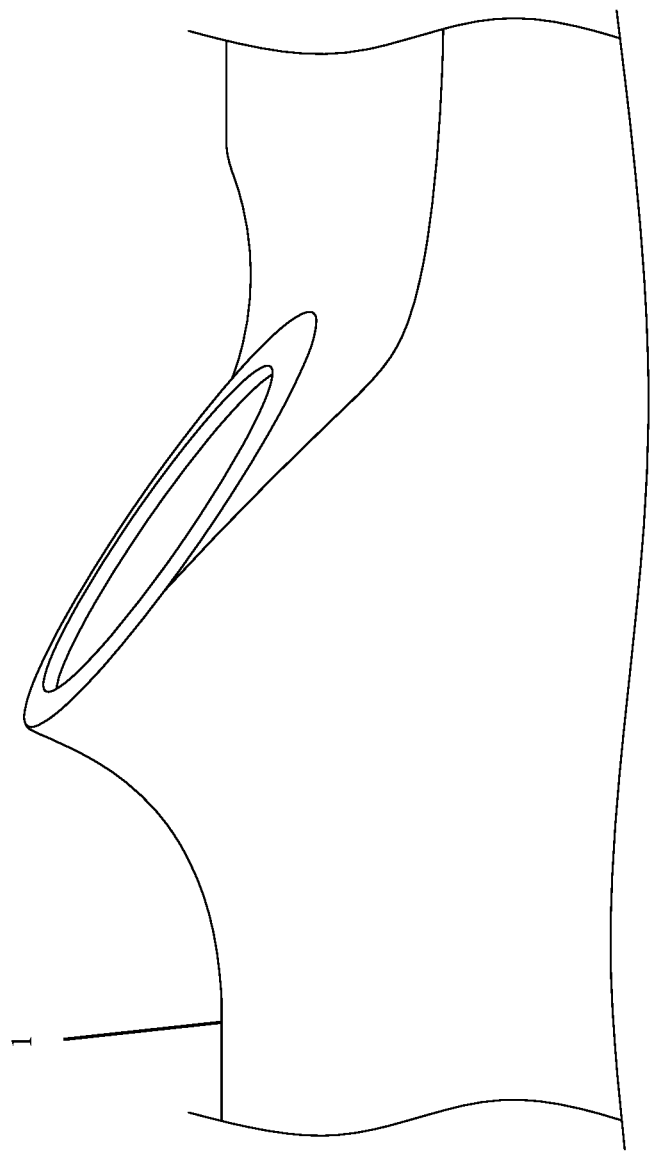
FIG. 4 is a photograph of finished pocket in 4" plastic pipe embossed by the present invention.
Figure 5:
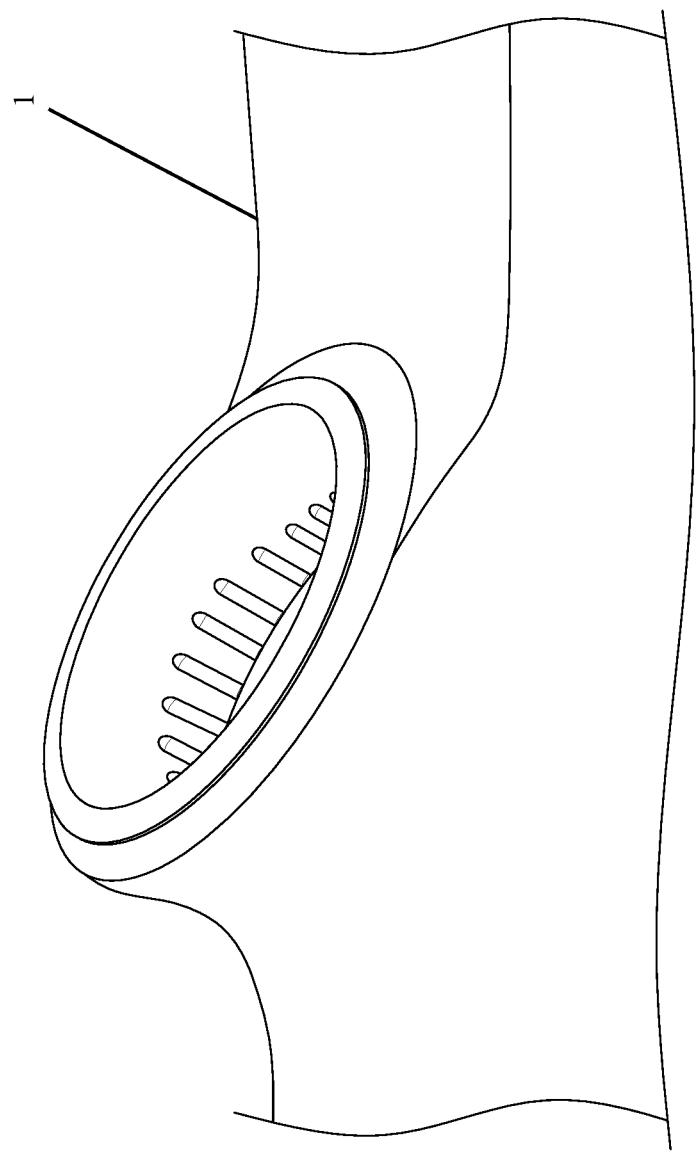
FIG. 5 is a photograph of a typical agricultural grow basket inserted into a finished pocket by the present invention.

Referring now to the invention in more detail, in FIG. 1 and FIG. 2 there is shown a plastic tube #1 a mandrel #2, embossing assembly #3, #4, #5, #6, #7, #8, #9 and #10

In more detail, still referring to the invention of FIG. 1 and FIG. 2, the mandrel #2 diameter is slightly smaller than the internal dimension of the plastic pipe or tube being embossed and the embossing punch #5 and die #10 is larger than the agricultural grow basket being inserted in the embossed pocket.

In further detail, still referring to the invention of FIG. 1 and FIG. 2, Levers #4 and #7 length can vary depending on pocket depth and angle desired.

The construction details of the invention as shown in FIG. 1 and FIG. 2 are that the mandrel #2 and embossing assembly #3, #4, #5, #6, #7, #8, #9 and #10 may be made of wood or of any other sufficiently rigid and strong material such as high-strength plastic, metal, and the like. Further, the various components of the mandrel #2, embossing assembly #3, #4, #5, #6, #7, #8, #9 and #10 can be made of different materials.

The advantages of the present invention include, without limitation, that it is unique and customizable way to emboss pockets in plastic pipe and tube to accept a variety of agricultural grow baskets sizes. It is a cost effective method to embossed standard plastic pipe and tube without special productions runs of this material.

In broad embodiment, the present invention is a embossing tool.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. An embossing assembly configured to emboss an inner pipe, comprising an elongated cylindrical member including at least two guide members, an embossing punch assembly, said at least two guide members spaced apart by said embossing punch assembly, said elongated cylindrical member including a slot of a predetermined length between said at least two guide members, said embossing punch assembly having a first and second lever, said first lever rigidly mounted to said elongated cylindrical member using a first pin joint and said second lever mounted to said elongated cylindrical member's slot using a sliding pin joint, said first and second lever mounted to each other using a second pin joint at their intersection, an embossing punch mounted at said intersection.

2. The embossing assembly of claim 1 wherein said embossing punch is positioned to cooperate with a die thereby effectuating the embossing.

* * * * *